March 17, 1970   P. RICHTER   3,500,698
COLLAPSIBLE STEERING COLUMN
Filed March 25, 1968
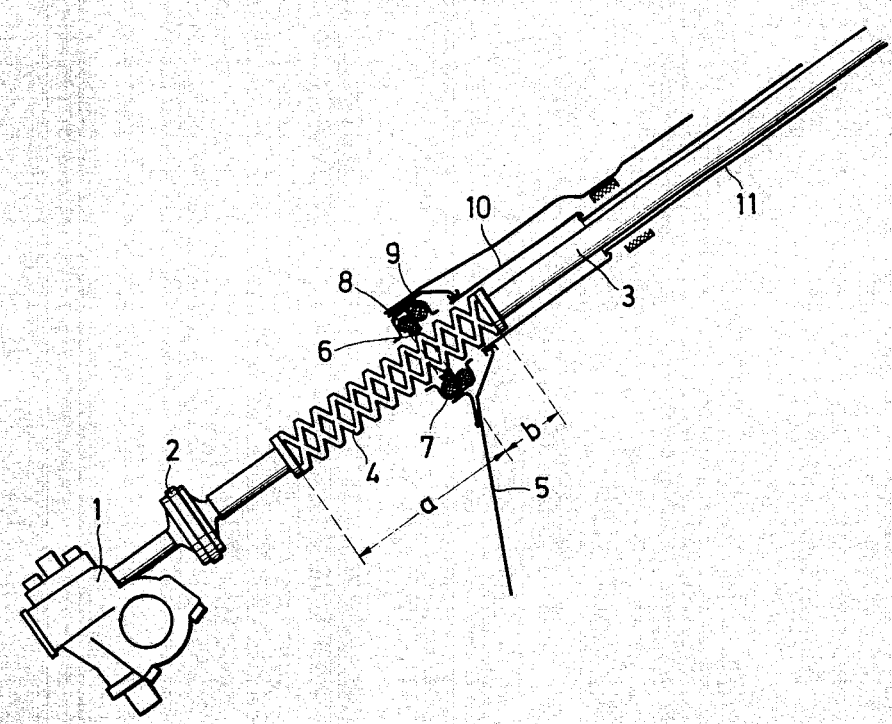
INVENTOR.
Philipp Richter
BY
Watson, Cole, Grindle & Watson
Attys.

United States Patent Office 3,500,698
Patented Mar. 17, 1970

3,500,698
COLLAPSIBLE STEERING COLUMN
Philipp Richter, 16 Behringstrasse,
318, Wolfsburg, Germany
Filed Mar. 25, 1968, Ser. No. 715,609
Claims priority, application Germany, Apr. 4, 1967,
1,655,598
Int. Cl. B62d 1/18
U.S. Cl. 74—493             2 Claims

ABSTRACT OF THE DISCLOSURE

A collapsible safety steering column for motor vehicles having an energy-absorbing element inserted directly into the steering column as one of a plurality of sections thereof.

---

This invention relates to a collapsible safety steering column for motor vehicles and is an improvement over the structure of the copending U.S. patent application Ser. No. 645,234, filed June 12, 1967.

In accidents involving motor vehicles which are sometimes quite serious particularly as to collisions, the steering column should be so constructed so that it can be deformed or collapsed in the area or axis in which the occupant or driver of the car is seated and if the steering column does not collapse, then this may lead to serious injuries to the driver.

A number of solutions have already been proposed in order to decrease the danger to the driver by the steering column in the event of an accident and one such construction from which the present invention has its start is to make the steering shaft of the steering column assembly resilient in an axial direction so that it will collapse in such a way that the thrust-like strain is more or less absorbed. It is therefore an object of the present invention to provide a section in the steering shaft of the steering column assembly which section is in the form of a grid-like energy absorber which is directly connected in the steering shaft itself.

It is therefore a further object of the invention to provide a collapsible element constructed in the form of a grid-like or perforated tube having interlocking metallic driven elements which are arranged in spiral formation and which will be capable of collapsing to a certain extent when sufficient force is directly axially thereon. It has been determined by experiments that such a tube will exactly collapse when sufficient force is present and the tube can be so installed that there will be first a partial collapse of the tubular element and then a final deformation of the steering column will take place in order to afford the best protection possible in connection with the operator of the vehicle so that the steering column will absorb the most dangerous reaction resulting from an accident. It is therefore another object of the invention to take care of a second collapse of the tubular element by impact of the driver on the steering wheel and to provide for a connection between a portion of the tubular element and a relatively non-deforming wall of the vehicle.

Further objects will be apparent from the following description when considered in connection with the accompanying drawing which shows a side view partly in section of the lower part of the steering column of a vehicle.

As clearly shown on the drawing, the steering column includes a steering drive or coupling 1 and the steering disk 2 which is at the lower end of the steering column and the steering shaft in its upper part is indicated by reference character 3 with a deformable grid-like tube 4 between the two sections 2 and 3 referred to. On the upper third part of the grid-like tube 4 there is secured a flange 6 and this flange is mounted with clearance within the holding ring 7 connected to the vehicle wall or body structure 5, which is relatively non-deforming. The flange 6 is fixed within the ring 7 by means of hard rubber or cellular material rings 8 and 9. A protecting tube 10 is provided around a portion of the steering column and is connected to the upper surrounding casing 11 through which the steering shaft 3 projects and is mounted.

As clearly shown on the drawing, in the event of an accident involving the vehicle, the grid-like tube 4 will collapse axially to the extent indicated by the arrows $a$, to the limits as indicated and thereupon the member 4 may collapse a further distance indicated by the arrows $b$, when the driver impacts against the steering wheel (not shown). The section $b$ can involve a lesser resistance when it is pressed together.

I claim:
1. A steering column for a vehicle comprising a steering shaft, a grid-like tube forming part of the shaft and composed of two sections which collapse with different resistance forces when the vehicle is involved in an accident, and means adapted to be connected to a wall structure of the vehicle to divide the grid-like tube into its two sections of resistance forces acting as shock absorbers.

2. A steering column according to claim 1, in which the means is in the form of a flange adapted to be mounted to the wall structure and secured to the grid-like tube.

References Cited

UNITED STATES PATENTS

| | | | |
|---|---|---|---|
| 3,262,332 | 7/1966 | Wight | 74—493 |
| 3,373,629 | 3/1968 | Wight et al. | 74—492 |
| 3,394,612 | 7/1968 | Bogosoff et al. | 74—492 |

MILTON KAUFMAN, Primary Examiner